J. T. TODD.
TIRE.
APPLICATION FILED AUG. 3, 1918.
1,285,471.
Patented Nov. 19, 1918.
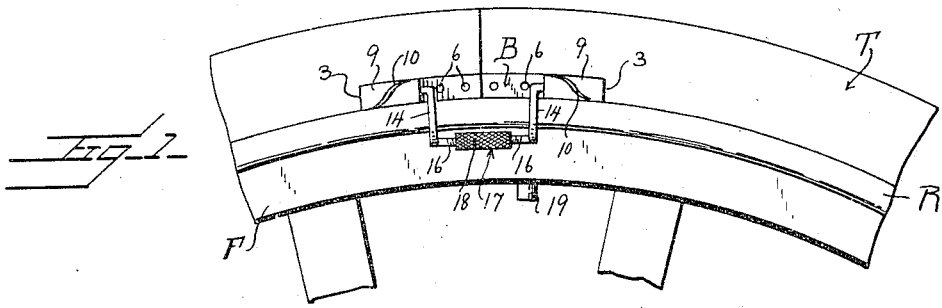
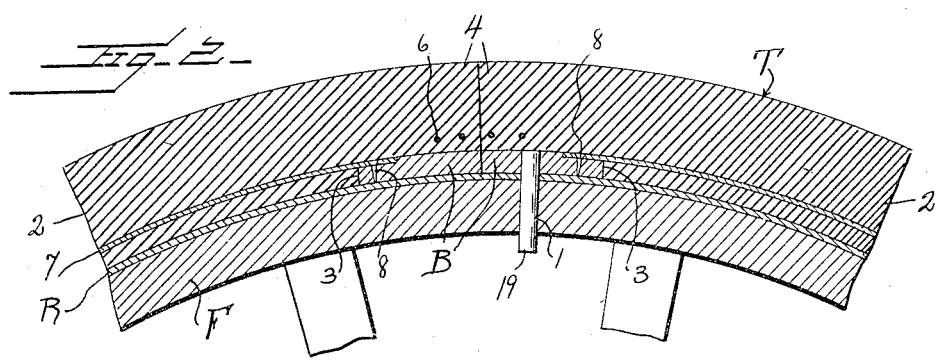
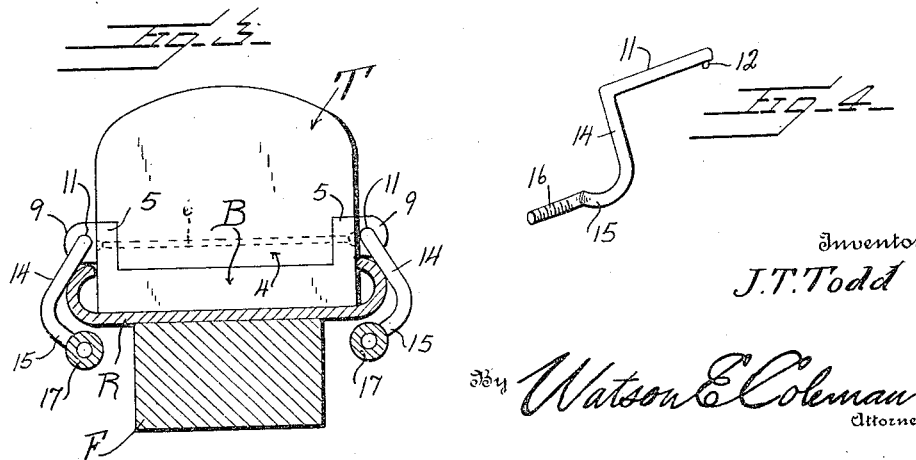
Inventor
J. T. Todd
By Watson E. Coleman
Attorney

UNITED STATES PATENT OFFICE.

JAMES T. TODD, OF DETROIT, MICHIGAN.

TIRE.

1,285,471.　　　　Specification of Letters Patent.　　Patented Nov. 19, 1918.

Application filed August 3, 1918. Serial No. 248,151.

*To all whom it may concern:*

Be it known that I, JAMES T. TODD, a citizen of the United States, residing at Detroit, in the county of Wayne and State of Michigan, have invented certain new and useful Improvements in Tires, of which the following is a specification, reference being had to the accompanying drawings.

This invention relates to certain improvements in tires and it is an object of the invention to provide a device of this general character having novel and improved means whereby it may be employed with convenience and facility at a time of emergency and particularly when an inflatable tire has been rendered unfit for use.

It is also an object of the invention to provide a novel and improved tire which may be readily applied to a wheel body in lieu of an inflated tire which has been rendered unfit for use so that the necessity of using a flat tire is obviated.

Another object of the invention is to provide a tire which is intended for temporary use and which is applied with novel and improved means whereby the same may be conveniently mounted and maintained in proper position upon a wheel body.

A still further object of the invention is to provide a novel and improved tire for emergency use comprising an elongated member of rubber or other cushioning material which is adapted to be disposed circumferentially around the felly of a wheel body and wherein the end portions of said member are provided with means for maintaining the member in applied position.

An additional object of the invention is to provide a novel and improved emergency tire including means coacting with the wheel body to which it is applied for holding the tire against independent movement circumferentially of the wheel body.

The invention consists in the details of construction and in the combination and arrangement of the several parts of my improved tire whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in side elevation illustrating a tire constructed in accordance with an embodiment of my invention and in applied position;

Fig. 2 is a longitudinal sectional view taken through the structure shown in Fig. 1;

Fig. 3 is a view partly in transverse section and partly in elevation of my improved tire as herein set forth; and Fig. 4 is a view in perspective of one of the operating rods detached.

As disclosed in the accompanying drawings F denotes the felly of a wheel structure having mounted thereon a rim R of any preferred type and disposed through the rim R and felly F is an opening 1 through which the inflating valve of a pneumatic tire is adapted to be directed in a well known manner when a tire of this type is applied to the rim R.

T denotes my improved tire in its entirety and this tire is adapted to be applied to the rim R at the time of an emergency, as when the inflatable tire becomes unfit for use as a result of puncture or other causes so that with the use of my improved tire the vehicle may be returned or otherwise driven to a suitable place for repairs without the necessity of riding upon a flat tire or a wheel rim which would otherwise have a tendency to materially injure either the tire or rim or both.

As herein disclosed my improved tire T comprises an elongated member 2 of rubber or other cushioning material and which is of a length to extend substantially entirely circumferentially of the rim R when applied thereto.

Each end portion of the member 2 has its inner face cut away as at 3 whereby an extension 4 is provided. This extension 4 snugly fits between the outstanding flanges 5 defining the side marginal portions of a body B formed of any suitable material. The extension 4 may be secured or held to the body B in any desired manner but preferably through the medium of the brads or the rivets 6 extending through the flanges 5 and the extension 4.

Embedded within the base portion of the member 2 and extending longitudinally thereof is a non-stretchable strip or member 7, herein disclosed as a band, and the opposite end portions of the strip 7 are riveted or otherwise secured, as indicated at 8, with the outer faces of the bodies B. By this arrangement undue stretching of the member 2 is prevented which would otherwise materially affect the efficiency of my improved device.

The side faces of each of the bodies B or more particularly the flanges 5 thereof, at their inner end portions are provided with the longitudinally disposed barrels or sleeves 9 and the bore of each of said barrels or sleeves has in communication therewith a spiral or cam slot 10 with the high point thereof adjacent the inner end of the barrel or sleeve.

Extending within each of the barrels or sleeves 9 from the outer end thereof is a rod 11 adapted to have both rotary and endwise movement. The portion of the rod 11 within the barrel or sleeve 9 is provided with a laterally directed finger or lug 12 extending within the spiral or cam slot 10 whereby endwise movement is imparted to the rod 11 when the same is rotated.

The outer end portion of each of the rods 11 provided with a lateral extension 14 and which extension is disposed substantially radial of the wheel body or felly F when said extension 14 is at the limit of its outward swinging movement. The extension 14 is continued by a substantially perpendicular arm 15 extending in a plane substantially at right angles to the plane of the rod 11 and said arm 15 terminates in an outwardly directed extension 16 arranged in a plane substantially in parallelism with the longitudinal plane occupied by the rod 11.

The rods 11 at the same sides of the bodies B coact one with the other with their extensions 16 coupled by an interposed sleeve 17. Each of the extensions 16 is threaded within an end portion of the sleeve 17 but the threads of one extension are reversed to the threads of the second extension so that upon rotation of the coacting sleeve 17 the rods 11 may be caused to move longitudinally one relative to the other but in reversed directions.

After my improved tire T has been mounted or applied to the rim R of a wheel body it is only necessary to rock each pair of connected rods 11 inwardly of the wheel structure and the resultant coaction of the fingers or lugs 12 with the barrels or sleeves 9 as afforded by the slots 10 will cause the bodies B to move one toward the other whereby the tire T is effectively clamped upon the rim R. Should this rocking movement of the rods 11 be insufficient to obtain the desired fitting of the tire T upon the rim R, the bodies B may be further moved one toward the other to increase the clamping action by imparting the requisite rotation to the sleeves 17. The manner whereby my improved tire may be removed from the rim is believed to be fully apparent to those skilled in the art to which my present invention appertains.

To facilitate the desired rotation of the sleeves 17 I find it of advantage to have the peripheries thereof knurled as indicated at 18.

One of the bodies B at substantially the center thereof has extending inwardly from its under base a pin 19 which extends within the opening 1 hereinbefore referred to and therefore the tire T is held against circumferential movement independently of the rim R.

From the foregoing description, it is thought to be obvious that a tire constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

An emergency tire comprising an elongated member of cushioning material, bodies secured to the opposite end portions of said member, longitudinally disposed sleeves carried by the opposite sides of the bodies and provided with cam slots, rods extending within said sleeves and capable of both rotary and endwise movement, each of said rods being provided with a lug extending within the slot of the coacting sleeve, and means for connecting each pair of rods at the same side of the bodies.

In testimony whereof I hereunto affix my signature in the presence of two witnesses.

JAMES T. TODD.

Witnesses:
 WALTER J. LANGLOIS,
 RICHARD N. BAKER.

Copies of this patent may be obtained for five cents each, by addressing the "Commissioner of Patents, Washington, D. C."